United States Patent
Voss

(10) Patent No.: US 11,399,125 B2
(45) Date of Patent: Jul. 26, 2022

(54) EQUIPMENT SYSTEM FOR CINEMATOGRAPHIC PRODUCTIONS

(71) Applicant: Arnold & Richter Cine Technik GmbH & Co. Betriebs KG, Munich (DE)

(72) Inventor: Hendrik Voss, Munich (DE)

(73) Assignee: ARNOLD & RICHTER CINE TECHNIK GMBH & CO. BETRIEBS KG, Munich (DE)

( * ) Notice: Subject to any disclaimer, the term of this patent is extended or adjusted under 35 U.S.C. 154(b) by 0 days.

(21) Appl. No.: 16/952,349

(22) Filed: Nov. 19, 2020

(65) Prior Publication Data

US 2021/0185216 A1    Jun. 17, 2021

(30) Foreign Application Priority Data

Dec. 11, 2019   (DE) .......................... 102019134028.4

(51) Int. Cl.
*H04N 5/232*    (2006.01)
*H04N 5/222*    (2006.01)

(52) U.S. Cl.
CPC ....... *H04N 5/23203* (2013.01); *H04N 5/2228* (2013.01)

(58) Field of Classification Search
CPC ............. H04N 5/23203; H04N 5/2228; H04N 5/2251; G08C 17/00; H04Q 9/00
See application file for complete search history.

(56) References Cited

U.S. PATENT DOCUMENTS 6,690,949 B1    2/2004  Shamlou et al.
6,819,867 B2 *  11/2004 Mayer, Jr. ................ G03B 3/12
                                                     396/56

(Continued)

FOREIGN PATENT DOCUMENTS

DE     4219331 A1    12/1993
DE    19629484 A1     1/1998

(Continued)

OTHER PUBLICATIONS

GoPro, GoPro Wi-Fi Combo Kit User Manual, Mar. 22, 2012, pp. 1-33 (Year: 2012).*

(Continued)

*Primary Examiner* — Chiawei Chen
(74) *Attorney, Agent, or Firm* — Amster, Rothstein & Ebenstein LLP

(57) ABSTRACT

The invention relates to an equipment system for cinematographic productions, having at least one film production device that is selected from a group comprising a motion picture camera, a lens ring drive unit, a motif lighting apparatus, and/or a remote control unit; and having at least two different radio modules. The film production device has an interface for a selective coupling to one of the two different radio modules, wherein each of the two different radio modules is configured for a wireless transmission of control signals and for a wired communication with the coupled film production device via the interface, and wherein the two different radio modules differ from one another with respect to their radio characteristics, namely with respect to a frequency range used and/or to a transmission protocol used.

12 Claims, 1 Drawing Sheet

(56) References Cited

U.S. PATENT DOCUMENTS

| | | | |
|---|---|---|---|
| 7,880,761 B2 | 2/2011 | Clark | |
| 8,325,270 B2 | 12/2012 | Woodman | |
| 8,994,840 B2* | 3/2015 | Koike | H04N 5/2256 348/211.3 |
| 9,185,305 B2* | 11/2015 | Ogasawara | G03B 7/16 |
| 9,712,688 B2* | 7/2017 | Pawlowski | H04N 1/00315 |
| 2003/0025802 A1* | 2/2003 | Mayer, Jr. | G03B 3/12 348/211.99 |
| 2006/0198164 A1* | 9/2006 | Ronn | F21V 23/0435 362/654 |
| 2008/0100712 A1* | 5/2008 | Hayes | H04N 5/225251 348/207.99 |
| 2008/0298792 A1* | 12/2008 | Clark | G03B 17/00 396/56 |
| 2009/0093688 A1* | 4/2009 | Mathur | H04N 7/18 600/300 |
| 2011/0001665 A1 | 1/2011 | King | |
| 2011/0123185 A1* | 5/2011 | Clark | H04N 5/2251 396/198 |
| 2013/0271619 A1* | 10/2013 | Longmore | G03B 17/56 348/211.99 |
| 2014/0198012 A1* | 7/2014 | Tseng | H01Q 21/28 343/876 |
| 2014/0270697 A1* | 9/2014 | Verheem | H04N 21/4334 386/326 |
| 2017/0339319 A1* | 11/2017 | Woodman | H04N 5/23293 |
| 2018/0131847 A1* | 5/2018 | Kokonaski | H04N 5/23293 |
| 2018/0288294 A1* | 10/2018 | Falk | H04N 5/44 |
| 2018/0359406 A1* | 12/2018 | Nagahiro | G06F 1/3206 |
| 2019/0066469 A1* | 2/2019 | Adler | H04N 7/188 |
| 2020/0265199 A1* | 8/2020 | Harney | H04W 4/80 |
| 2021/0021749 A1* | 1/2021 | Li | H04W 4/80 |

FOREIGN PATENT DOCUMENTS

| | | |
|---|---|---|
| EP | 1 224 805 B1 | 4/2004 |
| EP | 3 407 130 A1 | 11/2018 |
| WO | 2007028643 A1 | 3/2007 |
| WO | 2007128317 A1 | 11/2007 |
| WO | 2010046237 A1 | 4/2010 |
| WO | 2011127481 A2 | 10/2011 |
| WO | 2016009089 A1 | 1/2016 |
| WO | 2019051523 A1 | 3/2019 |

OTHER PUBLICATIONS

German Communication dated Oct. 2, 2020 in connection with German Patent Application No. 102019134028.4.
European Search Report dated Apr. 7, 2021 in connection with European Patent Application No. 20208572.6.

* cited by examiner

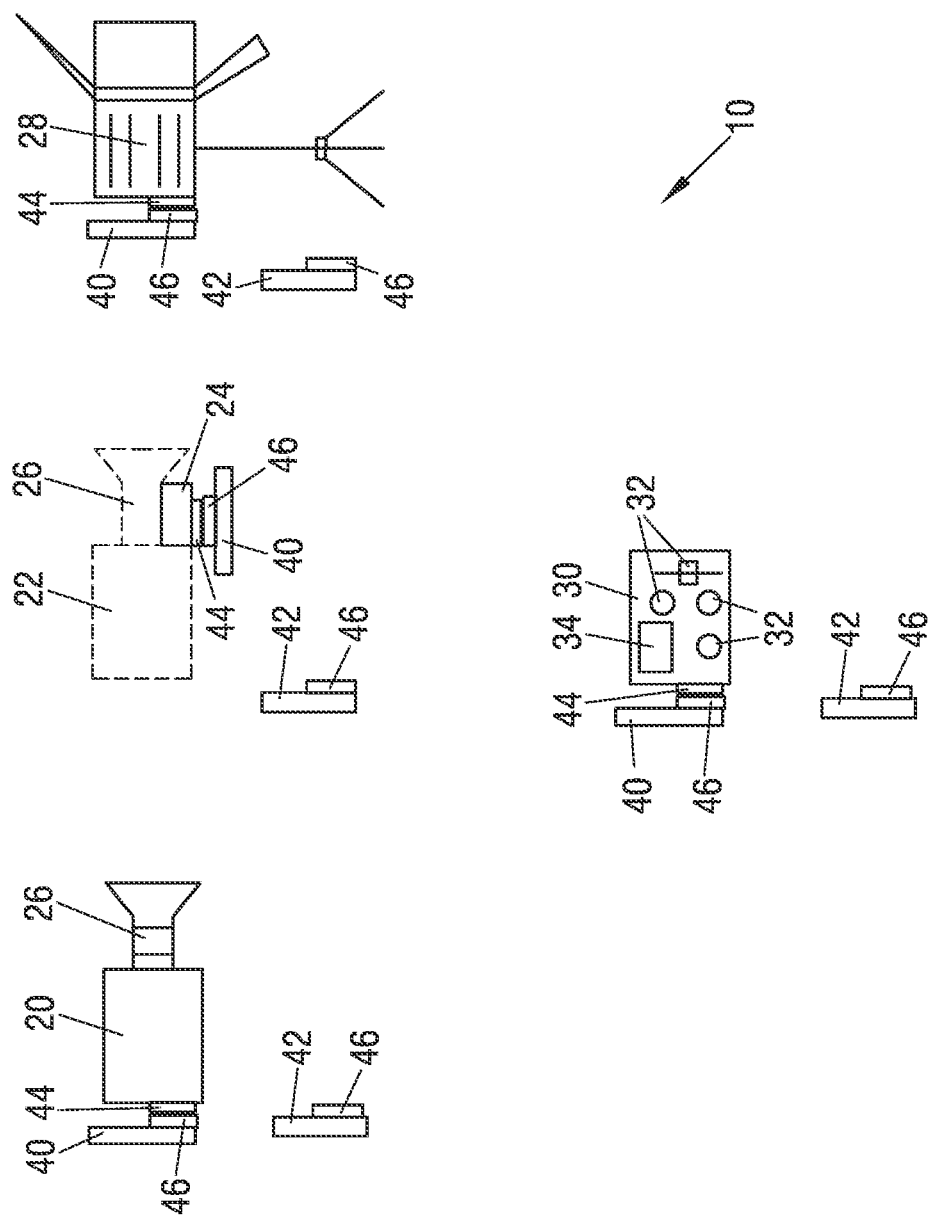

EQUIPMENT SYSTEM FOR CINEMATOGRAPHIC PRODUCTIONS

The present invention relates to an equipment system for cinematographic productions that are also designated as film productions in the present context. The equipment system comprises at least one motion picture production device that is designated in simplified terms as a film production device in the following and that could also be designated as a film production equipment device. The motion picture production device or film production device may comprise at least one motion picture camera, at least one lens ring drive unit, at least one motif lighting apparatus, and/or at least one remote control unit. The remote control unit may generally be a film production device remote control unit (that is a remote control unit for a motion picture production device) and may in particular be a camera remote control unit or a lighting remote control unit.

In the case of cinematographic productions (in particular for the cinema, but also for television or streaming services), different types of film production devices are used for which a remote operability is desirable in different situations.

An electronic motion picture camera typically comprises an integrated optical system (camera objective, camera lens) or a lens mount for mounting an interchangeable objective (interchangeable lens); further an electronic image sensor for generating image signals from incident light; and an image signal processing device for generating a digital image data stream from the image signals. To operate a motion picture camera, a large number of parameters are to be set and varied before and during the recording such as the image recording rate, the shutter speed, or the iris aperture opening, the focal position (sharpness) or the focal length (zoom factor) of the objective. In addition to a setting of these parameters at the camera itself, some or all of these parameters may also performed via corresponding remote control units, wherein radio-based remote control units are predominantly used for this purpose.

The setting of the iris aperture opening, of the focal position and of the focal length frequently takes place at lens rings of the camera objective. Operating elements that are either attached to the camera itself or are implemented as remote controls are preferably used for a simpler and more reliable setting of the camera objectives. The remote controllability may, for example, take place via an external lens ring drive unit that is connected to the camera objective. In such a lens ring drive unit, one or more actuating motors are provided that each transmit a torque via a toothed pinion to a toothed ring of a lens ring of the camera objective and in this way effect a setting of the lens ring for focusing or for setting the iris aperture or the focal length. Such a lens ring drive unit is, for example, known from DE 42 19 331 A1. Lens ring drive units may also be provided as retrofit solutions for motion picture cameras that were not originally remotely controllable.

Furthermore, a remote controllability is also desirable for motif lighting apparatus that serve to illuminate a film set. Such a motif lighting apparatus may comprise at least one light source for transmitting light; optionally a light beam bundling device; and further a control device for controlling the light source. Optionally, an active or a passive cooling device for cooling the light source may be provided. A light source that may be mounted in a stationary manner is, for example, known from WO 2007/028643 A1. Mobile motif lighting apparatus may be fastened to a tripod or may be mounted at motion picture cameras. Different functions may be remote-controlled with the aid of an associated remote control unit such as a switching on and off of the light source, a control of the brightness and/or of the light color of the light source, a focusing of the light beam bundling device, or also an adjustment apparatus for changing the orientation of the motif lighting apparatus.

This list of film production devices is not exhaustive, but purely exemplary. Remote control units may be provided to remotely control said film production devices and, in the present connection, they are likewise designated as film production devices or film production equipment devices and are either associated in a dedicated manner with a specific type of device or may be used for different types of film production devices in the manner of a universal remote control, wherein a respective remote control unit may also alternatively or simultaneously address a plurality of device types.

A typical remote control unit, in particular a camera remote control unit or a lighting remote control unit, has one or more operating elements with which specific operating functions may be fixedly or selectively associated. The operating elements may, for example, comprise a button; a switch; a rotary actuator (e.g. an adjustment wheel); a linear actuator (e.g. a slider); or touch-sensitive operating elements such as touch screens or touch pads. Furthermore, one or more display apparatus may be provided that reproduce information on one or more set operating values. A reproduction of an image recorded by a motion picture camera at a display apparatus of an associated remote control unit may also be provided. Exemplary remote control units are known from DE 196 29 484 A1 and WO 2010/046237 A1.

Film production devices having a radio-based remote control are, like very many radio applications, subject to specific legal regulations that vary from country to country. These regulations often provide transmission frequencies or transmission protocols, which differ from country to country, for respective radio applications. If a film production device is operated in a country for which it does not comply with the applicable regulations, in addition to the risk that such a violation of the regulations will be prosecuted under administrative or criminal law, there is also the further risk that the operation of the film production device may be disrupted by other radio applications, which may under certain circumstances result in flawed motion picture recordings and in additional financial expenses associated therewith.

It is an object of the invention to provide an equipment system for cinematographic productions that can be operated in accordance with the regulations and free of disruptions at different geographical locations to which different regulations for radio applications apply.

The object is satisfied by an equipment system for cinematographic productions having the features of claim 1. Advantageous embodiments of the equipment system are set forth in the dependent claims or result from the description or from the FIGURES.

Such an equipment system for cinematographic productions comprises at least one film production device, which is a motion picture camera, a lens ring drive unit, a motif lighting apparatus and/or a remote control unit, and at least two different radio modules. The film production device has an interface for a selective coupling to one of the at least two different radio modules, wherein each of the two different radio modules is configured for a wireless transmission of control signals and for a wired communication with the coupled film production device via the interface, wherein the two different radio modules differ from one another with respect to their radio characteristics, namely with respect to a frequency range used and/or to a transmission protocol used.

In this sense, a radio module is a communication apparatus for a unidirectional or bidirectional transmission of control signals with the aid of modulated electromagnetic waves in the radio frequency range. A radio module thus in particular serves for the wireless transmission of control signals or other signals to another film production device or to a further radio module coupled thereto and/or for the wireless reception of such signals. The interface enables the electrical or technical signal coupling of a radio module to a film production device, wherein the interface may also serve as a mechanical interface or coupling device or a separate mechanical interface or coupling device may be provided.

The frequency ranges and/or transmission protocols used are subject to national or supranational regulations that are issued by the responsible legislator and that are frequently based on standards or standardizations that are developed by international organizations such as the IEEE (Institute of Electrical and Electronics Engineers). Specific frequency ranges, which are also designated as ISM bands (industrial, scientific and medical bands), are usually provided for an approval-free operation of radio frequency devices in industry, science, medicine and the domestic sector. The different frequency ranges are frequently designated by a respective characteristic frequency. Examples of this are the frequency ranges around the frequencies 315 MHz, 433 MHz, 868 MHz, 915 MHz of the 2.4 GHz frequency. Different transmission protocols are likewise regulated or at least standardized. Examples of this are the transmission protocols in accordance with the IEEE 802.15 standard (also known as Bluetooth or WPAN), the IEEE 802.11 standard (also known as WLAN) or the IEEE 802.16 standard (also known as WiMAX). In the standards for specific transmission protocols, the frequency ranges that may be used therefor are frequently likewise defined.

The present invention thus provides different types of exchangeable radio modules, which each have different radio characteristics, for a film production device. In accordance with the geographical operating site of the film production device, a radio module may be selected from the present radio modules that corresponds to the legal regulations applicable there (i.e. country-specific regulations) with respect to the radio characteristic. If a plurality of radio modules that may be operated in accordance with the applicable regulations are available for selection for a given operating site, the selection may also be based on the greatest possible freedom from interference. The 2.4 GHz frequency range can be named as an example of this; an approval-free operation of radio applications is permitted in this frequency range in most countries around the world. However, this has the result that very many different devices often have to locally share a limited frequency range, which may result in interference or at least in extended latency periods. In this case, the present equipment system offers the possibility of switching to a frequency range less susceptible to interference or to a transmission protocol less susceptible to interference with little effort by a simple change of the radio module.

In accordance with an embodiment, each of the two different radio modules has a counter interface, wherein the counter interfaces of the two different radio modules are identical to one another and are compatible with the interface of the film production device. Said compatibility or identity exists both in a mechanical aspect, i.e. with respect to the mechanical fastening means or coupling means, and in an electrical aspect, i.e. in particular with respect to the number, the arrangement and the function of respective electrical contacts. Thus, any type of radio module may be coupled to each film production device of the equipment system or at least to each film production device of the same type. The interfaces of all the film production devices are preferably compatible with one another, in particular identical to one another, i.e. a respective radio module may be selectively coupled to a motion picture camera, to a motif lighting apparatus, to a lens ring drive unit, or to a remote control unit.

In some embodiments, the respective radio module may have a control circuit that is configured to convert a control signal received by radio into an electrical signal that is transmitted to the coupled film production device, in particular via said counter interface of the radio module and via the interface of the coupled film production device. Alternatively or additionally, the control circuit may be configured to convert an electrical signal received by the coupled film production device (in particular via said counter interface) into a control signal that is transmitted by radio. The control circuit may, for example, comprise one or more of the following devices: an integrated circuit (IC); a microprocessor; a central processing unit (CPU); an application-specific integrated circuit (ASIC); or a field programmable gate array (FPGA).

The respective radio module may have a radio transmission unit and a radio reception unit for generating and transmitting or for receiving and decoding radio signals (e.g. a transceiver). The respective radio module may have its own housing.

In some embodiments, the respective radio module may be configured without its own energy source, wherein the radio module may be configured to obtain the supply of the energy required for the operation from the coupled film production device, in particular via its interface.

In some embodiments, the equipment system comprises at least one motion picture camera or at least one lens ring drive unit or at least one motif lighting apparatus and at least one remote control unit for remotely controlling the motion picture camera or the lens ring drive unit or the motif lighting apparatus, wherein the equipment system comprises at least a first set and a second set of radio modules, wherein the radio modules of the first set are identical to one another with respect to their radio characteristics, wherein the radio modules of the second set are identical to one another with respect to their radio characteristics, and wherein the radio modules of the first set differ from the radio modules of the second set with respect to their radio characteristics. Depending on the geographical operating site or the desired radio characteristic, the motion picture camera or the lens ring drive unit or the motif lighting apparatus, on the one hand, and the film production device remote control unit, on the other hand, may be coupled to radio modules of the same set and are thus compatible with one another with respect to their radio characteristics. The number of radio modules of each set preferably corresponds to the number of film production devices of the equipment system, but it should amount to at least two, namely one for the motion picture camera or the lens ring drive unit or the motif lighting apparatus and one for the remote control unit.

Alternatively, however, it is also possible that only the film production device remote control unit is coupled to one of the at least two different radio modules, while the motion picture camera or the lens ring drive unit or the motif lighting apparatus has a fixedly predefined or switchable radio characteristic. The motion picture camera or the objective drive unit or the motif lighting apparatus may also be multi-band capable and may thus adapt to the used radio module of the remote control unit with respect to its radio characteristic, which may take place by an initialization or a handshake. To correspond to the set regulations in this respect, provision may be made that the motion picture camera or the lens ring drive unit or the motif lighting apparatus only transmits when it has received a corresponding signal from an associated remote control unit and was able to adjust to the radio characteristic used by the remote control unit.

In accordance with a further embodiment, provision is made that the equipment system comprises at least three different radio modules that each differ from one another with respect to their radio characteristics.

In some embodiments, the respective film production device to which the radio modules of the equipment system can be coupled has a housing, wherein the interface of the respective film production device is arranged and configured such that the coupled radio module is arranged outside the housing of the film production device. A comfortable exchange of the radio module is thereby ensured. An unimpeded transmission of the radio signals is moreover ensured by the fastening to an outer side of the housing of the film production device.

In accordance with a further embodiment, each radio module of the equipment system has an externally or internally arranged antenna. Thus, each radio module has its own antenna, which is optimized with respect to the respective frequency range used by the radio module, whereby the transmission or reception quality, which also influences the range, is improved with respect to a generic antenna installed in or at the device. In this connection, an externally arranged antenna refers to an antenna provided outside a housing of the radio module, while an internal antenna is provided within a housing of the radio module.

In some embodiments, each radio module is marked with at least one respective visible code that represents the type or the radio characteristic of a respective radio module. The visible or visually perceivable code may be a color code, an alphanumeric code, a symbol code, or a combination of a plurality of said codes. A type of a respective radio module is understood as those radio modules that are identical to one another with respect to their radio characteristics and in particular as those radio modules that belong to a specific set of radio modules. In other words, radio modules of the same type also have the same code, which makes it easier to couple mutually compatible radio modules to the different film production devices of the equipment system.

In accordance with a further embodiment, the remote control unit of the equipment system may be configured as a camera remote control unit for remotely controlling a motion picture camera having a lens actuating motor, wherein the lens actuating motor may be integrated into the motion picture camera or into the camera objective or may be part of an external lens ring drive unit. In this embodiment, the remote control unit has at least one movable operating element (e.g. a push button, a switch, a rotary actuator, a linear actuator) for setting control commands for the lens actuating motor and has an evaluation and control device, wherein the evaluation and control device is configured to generate control signals for the lens actuating motor in dependence on the set control commands and to transmit the generated control signals to a coupled radio module of the equipment system via the interface of the remote control unit. The evaluation and control device of the camera remote control unit may, for example, comprise one or more of the following devices: an integrated circuit (IC); a microprocessor; a central processing unit (CPU); an application-specific integrated circuit (ASIC); or a field programmable gate array (FPGA). Such a remote control device may also comprise a base part, wherein the operating element is movable relative to the base part, and wherein the control commands correspond to a respective position or movement of the operating element relative to the base part.

In accordance with a further embodiment, the remote control unit of the equipment system may be configured as a lighting remote control unit for remotely controlling a motif lighting apparatus for a film set, wherein the remote control unit has at least one operating element for setting control commands for the motif lighting apparatus (e.g. a push button, a switch, a rotary actuator, a linear actuator, or a touch-sensitive operating element such as a touch screen or a touch pad). Furthermore, the remote control unit has an evaluation and control device that is configured to generate control signals for the motif lighting apparatus in dependence on the set control commands and to transmit the generated control signals to a coupled radio module of the equipment system via the interface of the remote control unit. The evaluation and control device of the lighting remote control unit may, for example, comprise one or more of the following devices: an integrated circuit (IC); a microprocessor; a central processing unit (CPU); an application-specific integrated circuit (ASIC); or a field programmable gate array (FPGA).

In accordance with a further advantageous embodiment, said group of film production devices further comprises an adapter module for a motion picture camera, said adapter module having, in addition to the interface for a selective coupling to one of the two different radio modules, an adapter interface for coupling to a motion picture camera and an actuating motor interface for coupling to a lens ring drive unit. The adapter module is configured for a wired communication with the coupled radio module via the interface of the adapter module and for a wired communication with the coupled motion picture camera via the adapter interface. The communication with the motion picture camera may, for example, comprise control signals for starting or stopping a motion picture recording or control signals for frame rate settings or shutter speeds, wherein these control signals may in particular be received via the coupled radio module. The lens ring drive unit may, as already explained, be an external unit that is connected to a camera objective to rotate a lens ring of the camera objective by means of a respective actuating motor. The adapter module is configured for a wired communication with the lens ring drive unit via the actuating motor interface. The communication with the lens ring drive unit may comprise control signals for lens ring settings, wherein these control signals may also in particular be received via the coupled radio module.

The adapter module thus makes it possible to also couple a radio module of the equipment system to a motion picture camera that does not have a directly suitable interface for the radio module. The adapter module in particular provides connections, which are present at or are to be retrofitted at a motion picture camera and which are e.g. configured for a coupling to a non-system remote control for remotely controlling specific camera functions, for a coupling to one of the radio modules and thus provides a retrofit solution in order to integrate originally non-system motion picture cameras into the present equipment system.

The invention also relates to a film production device, in particular a motion picture camera, a lens ring drive unit, a motif lighting apparatus or a remote control unit (in particular a film production device remote control unit, e.g. a camera remote control unit or a lighting remote control unit), that is configured to be coupled to one of at least two different radio modules that differ from one another with respect to their radio characteristics, namely with respect to a frequency range used and/or to a transmission protocol used. For this purpose, the film production device may have an interface of the type explained. Such a film production device may have a recognition device that is configured to receive an identification of the radio characteristic used from the coupled radio module. The recognition device may be part of a correspondingly configured evaluation and control device of the film production device, for example, of the evaluation and control device already mentioned. The identification of the radio characteristic used may comprise a predetermined encoding of a frequency range and/or of a transmission protocol or a predetermined encoding of the respective type of the different radio modules. The recognition device may be configured to associate the received identification with a predetermined radio characteristic, for example on the basis of a stored association table. Due to the possibility of recognizing the type of the radio module coupled or of the radio characteristic used, this information may be signaled to the user and/or to other devices, for example, in order to ensure the uniform use of a specific type of radio modules or of a radio characteristic.

In accordance with an embodiment, such a film production device may also have a display device that is configured to display information on the identification received or on the radio characteristic used. The type or the radio characteristic of the coupled radio module may thereby also be easily recognized when a code of the above-mentioned type is not visible or is not present.

The invention will be described in the following with reference to an embodiment and to the drawings.

FIG. 1 shows an equipment system in accordance with an embodiment in a schematic representation.

FIG. 1 shows an exemplary equipment system 10 for cinematographic productions that comprises a plurality of film production devices, namely a motion picture camera 20; a lens ring drive unit 24; a motif lighting apparatus 28; and a remote control unit 30.

Different parameters may be set and/or varied in a remote-controlled manner at the motion picture camera 20, for example, the image recording rate, the shutter speed, or the iris aperture opening, the focal position, and/or the focal length of an objective 26 of the motion picture camera 20. The remote control of the motion picture camera 20 may, for example, take place by means of the remote control unit 30. The remote control unit 30 has a plurality of operating elements 32 for operating the camera functions. To monitor the settings and/or the image that is recorded by the motion picture camera 20 and that is transmitted wirelessly, the remote control unit 30 may additionally comprise a display apparatus 34.

The lens ring drive unit 24 may be arranged at an objective 26 of the motion picture camera 20 or at a further motion picture camera 22 and may comprise one or more actuating motors that are mechanically couplable to lens rings of the objective 26 in order to set different objective parameters, such as the iris aperture opening, the focal position or the focal length, in a remote-controlled manner.

The motif lighting apparatus 28 may comprise an integrated light source that may be switched on and off in a remote-controlled manner and whose brightness and/or light color may preferably likewise be set in a remote-controlled manner. Furthermore, the orientation of the motif lighting apparatus 28 may also be changed, for example, via a motorized tilt and swivel apparatus (not shown).

The remote control of the lens ring drive unit 24 and of the motif lighting apparatus 28 may likewise take place via the remote control unit 30 or a further remote control unit of identical design thereto or also via a further remote control unit having a different number, arrangement and/or functionality of the operating elements.

A respective two different radio modules 40, 42 are associated with each film production device 20, 24, 28, 30 and possibly also with each further remote control unit, wherein all the radio modules 40 are identical to one another with respect to their radio characteristics and form a first set of radio modules 40, and wherein the radio modules 42 are likewise identical to one another with respect to their radio characteristics and form a second set of radio modules 42. However, the radio modules 40 of the first set differ from the radio modules 42 of the second set with respect to their radio characteristics, namely with respect to a frequency range used and/or to a transmission protocol used.

Each film production device 20, 24, 28, 30 has a respective interface 44 for a selective coupling to one of the two different radio modules 40, 42, wherein each of the two different radio modules 40, 42 is configured for a wireless transmission of control signals and for a wired communication with the coupled film production device 20, 22, 24, 28, 30 via the interface 44. The wireless transmission of control signals and/or of other signals may be unidirectional or bidirectional. The interfaces 44 of the film production devices 20, 24, 28, 30 are formed identically to one another in a mechanical and electrical aspect.

Each radio module 40, 42 has a respective counter interface 46 that is compatible with the interfaces 44 of the film production devices 20, 24, 28, 30 in order to couple a radio module 40, 42 to a respective film production device 20, 24, 28, 30, wherein the interface 44 and the counter-interface 46 in each case together establish a mechanical and electrical connection between the coupled radio module 40, 42 and the associated film production device 20, 24, 28, 30.

In the present example, the coupled radio modules 40 are located at an outer side of the associated film production device 20, 24, 28, 30. In accordance with a modification, the coupled radio modules 40 may also at least partly be arranged within a respective device housing of the associated film production device 20, 24, 28, 30.

The respective radio module 40, 42 has a radio transmitter and a radio receiver in the embodiment shown. Furthermore, in the embodiment shown, the radio modules 40, 42 each have inwardly disposed antennas, i.e. the antennas are located within a housing of the radio modules 40, 42. In accordance with a further modification, the antennas may also be arranged externally with respect to a respective module housing (not shown).

In the representation of FIG. 1, all the film production devices 20, 24, 28, 30 are coupled to the radio modules 40 of the first set. Since the radio modules 40 are of the same type with respect to one another, all the film production devices 20, 24, 28, 30 communicate with the same radio characteristic, i.e. in the same frequency range and with the same transmission protocol. It is understood that, in the individual case, the different film production devices 20, 24, 28, 30 of an equipment system 10 may, however, communicate at different frequencies within the uniform frequency range in order to exclude mutual interference. This is in particular useful when a plurality of remote control units 30 are to be used that are each associated in a dedicated manner with a specific film production device to be controlled, such as with a motion picture camera 20, a lens ring drive unit 24, or a lighting unit 28.

If the equipment system 10 is now to be used at another geographical location for which, based on regulatory provisions, it is not permitted to use the radio modules 40 of the first set, but rather only radio applications are permitted to which the radio modules 42 of the second set correspond, all the radio modules 40 may be released from the film production devices 20, 24, 28, 30 and the radio modules 42 of the second set may instead be coupled. Since these radio modules 42 are again of the same type, i.e. have the same radio characteristics, the communication of the film production devices 20, 24, 28, 30 may take place in the same way as with the radio modules 40, i.e. the provided communication relationships of the film production devices with one another are generally maintained. Due to the possibility of selectively providing a respective film production device 20, 24, 28, 30 with one of a plurality of different radio modules 40, 42, a suitable radio characteristic may be selected in a simple manner and with a low cost effort.

To enable a distinction of the different types of radio modules 40, 42, each radio module 40, 42 may be marked with a respective visible code, for example, with a color code, an alphanumeric code, a symbol code, or a combination of a plurality of said codes, wherein the code represents the type of a respective radio module 40, 42. For example, all the radio modules 40 of the first type may be marked with a blue circle and all the radio modules 42 of the second type may be marked with a red square. In addition, an alphanumeric code may be printed, for example, the country codes of those countries in which an operation of a respective radio module 40, 42 is permitted.

The equipment system 10 in accordance with FIG. 1 comprises two different radio modules 40, 42 for each film production device 20, 24, 28, 30. Three or more different radio modules may naturally also be provided for a film production device 20, 24, 28, 30.

The number of film production devices 20, 24, 28, 30 in the equipment system 10 shown is likewise exemplary. Thus, the number of film production devices 20, 24, 28, 30 in an equipment system 10 may also amount to more than or less than four. A single film production device 20, 24, 28 or 30, including the associated two radio modules 40 and 42, in particular already forms a respective equipment system 10 in the sense of the present invention.

An exemplary equipment system typically comprises at least one film production device to be controlled, such as a motion picture camera 20, a lens ring drive unit 24 or a motif lighting apparatus 28, and further at least one remote control unit 30 as the controlling film production device.

In the present example, the coupled radio modules 40 are located at an outer side of the associated film production device 20, 24, 28, 30. In accordance with a modification, the coupled radio modules 40 may also be arranged within a respective device housing.

In accordance with a further modification, an adapter module (not shown) for a motion picture camera may also be provided as a further film production device, said adapter module having, in addition to an interface 44 for a selective coupling to one of the two different radio modules 40, 42, an adapter interface for coupling to a motion picture camera and an actuating motor interface for coupling to a lens ring drive unit, wherein the adapter module is configured for a wired communication with the coupled radio module 40, 42 via the interface 44, for a wired communication with the coupled motion picture camera via the adapter interface, and for a wired communication with the lens ring drive unit via the actuating motor interface.

REFERENCE NUMERAL LIST

10 equipment system
20, 22 motion picture camera
24 lens ring drive unit
26 objective
28 motif lighting apparatus
30 remote control unit
32 operating element
34 display apparatus
40, 42 radio module
44 interface
46 counter interface

The invention claimed is:

1. An equipment system (10) for cinematographic productions, comprising a plurality of film production devices (20, 22, 24, 28, 30), the plurality of film production devices (20, 22, 24, 28, 30) comprising at least one motion picture camera (20, 22) or at least one lens ring drive unit (24) or at least one motif lighting apparatus (28), the plurality of film production devices (20, 22, 24, 28, 30) further comprising at least one remote control unit (30) configured to remotely control the at least one motion picture camera (20, 22) or the at least one lens ring drive unit (24) or the at least one motif lighting apparatus (28);

and at least a first set and a second set of radio modules (40, 42), wherein each of the plurality of film production devices (20, 22, 24, 28, 30) comprises an interface (44) configured for a selective coupling to one of the radio modules (40, 42) of the first set and the second set, wherein the interface (44) is further configured to enable transmission of control signals between the film production device (20, 22, 24, 28, 30) and the coupled one of the radio modules (40, 42) of the first set and the second set by wired communication, wherein each of the radio modules (40, 42) of the set and the second set is configured to enable a wireless transmission of the control signals, and wherein radio characteristics of the radio modules (40) of the first set are identical to one another; wherein radio characteristics of the radio modules (42) of the second set are identical to one another; wherein the radio characteristics of the radio modules (40) of the first set differ from the radio characteristics of the radio modules (42) of the second set, wherein the radio characteristics of the radio modules (40, 42) of the first set and the second set comprise at least one of a frequency range or a transmission protocol; wherein the at least one motion picture camera or the at least one lens ring drive unit or the at least one motif lighting apparatus on the one hand and the at least one remote control unit on the other hand can be selectively coupled with radio modules of the same one of the first set and the second set and are thus compatible with each other with regard to their radio characterisitics.

2. An equipment system (10) in accordance with claim 1, wherein each of the radio modules (40, 42) of the first set and the second set has a counter interface (46), wherein the counter interfaces (46) of the radio modules (40, 42) of the first set and the second set are identical to one another and are compatible with the interfaces (44) of the plurality of film production devices (20, 22, 24, 28, 30).

3. An equipment system (10) in accordance with claim 1, wherein each of the radio modules (40, 42) of the first set and the second set comprises a control circuit that is configured to convert a control signal received by radio into an electrical signal, which is transmitted to the coupled one of the plurality of film production devices (20, 22, 24, 28, 30), and to convert an electrical signal received by the coupled one of the plurality of film production devices (20, 22, 24, 28, 30) into a control signal that is transmitted by radio.

4. An equipment system (10) in accordance with claim 1, wherein the equipment system (10) comprises at least three different radio modules (40, 42) that differ from one another with respect to their radio characteristics.

5. An equipment system (10) in accordance with claim 1, wherein the at least one motion picture camera (20, 22) or the at least one lens ring drive unit (24) or the at least one motif lighting apparatus (28) or the at least one remote control unit (30) has a housing, wherein the coupled one of the radio modules (40, 42) of the first set and the second set is arranged outside the housing.

6. An equipment system (10) in accordance with claim 1, wherein each of the radio modules (40, 42) of the first set and the second set has an externally or internally arranged antenna.

7. An equipment system (10) in accordance with claim 1, wherein each of the radio modules (40, 42) of the first set and the second set is marked with at least one visible code which represents the radio characteristic of the respective radio module.

8. An equipment system (10) in accordance with claim 7, wherein the at least one visible code comprises at least one of a color code, an alphanumeric code, or a symbol code.

9. An equipment system (10) in accordance with claim 1, wherein the at least one remote control unit (30) is configured as a camera remote control unit for remotely controlling a motion picture camera (20, 22) of the plurality of film production devices having a lens actuating motor, and wherein the at least one remote control unit (30) has a movable operating element for setting control commands for the lens actuating motor and has an evaluation and control device, wherein the evaluation and control device is configured to generate control signals for the motion picture camera (20, 22) in dependence on the set control commands and to transmit the generated control signals to the coupled one of the radio modules (40, 42) of the first set and the second set via the interface (44) of the at least one remote control unit (30).

10. An equipment system (10) in accordance with claim 1, wherein the at least one remote control unit (30) is configured as a lighting remote control unit for remotely controlling a motif lighting apparatus (28) of the plurality of film production devices, and wherein the at least one remote control unit (30) has at least one operating element for setting control commands for the motif lighting apparatus (28) and has an evaluation and control device, wherein the evaluation and control device is configured to generate control signals for the motif lighting apparatus (28) in dependence on the set control commands and to transmit the generated control signals to the coupled one of the radio modules (40, 42) of the first set and the second set via the interface (44) of the at least one remote control unit (30).

11. An equipment system (10) in accordance with claim 1, wherein said plurality of film production devices (20, 22, 24, 28, 30) further comprises an adapter module, said adapter module having: an interface (44) for a selective coupling to one of the radio modules (40, 42) of the first set and the second set; an adapter interface for coupling to a motion picture camera (20, 22); and an actuating motor interface for coupling to a lens ring drive unit, wherein the adapter module is configured for a wired communication with the coupled one of the radio modules (40, 42) of the first set and the second set via the interface (44), for a wired communication with the coupled motion picture camera (20, 22) via the adapter interface, and for a wired communication with the lens ring drive unit via the actuating motor interface.

12. An equipment system (10) in accordance with claim 1, wherein the at least one motion picture camera (20, 22) or the at least one lens ring drive unit (24) or the at least one motif lighting apparatus (28) or the at least one remote control unit (30) has a recognition device that is configured to receive from the coupled one of the radio modules (40, 42) of the first set and the second set an identification of the radio characteristic used by the coupled one of the radio modules (40, 42) of the first set and the second set.

\* \* \* \* \*